March 27, 1956  M. W. GRIFFES ET AL  2,740,074
ELECTRIC CONTROL DEVICE
Filed April 3, 1953　　　　　　　　　　　　　　　4 Sheets-Sheet 1
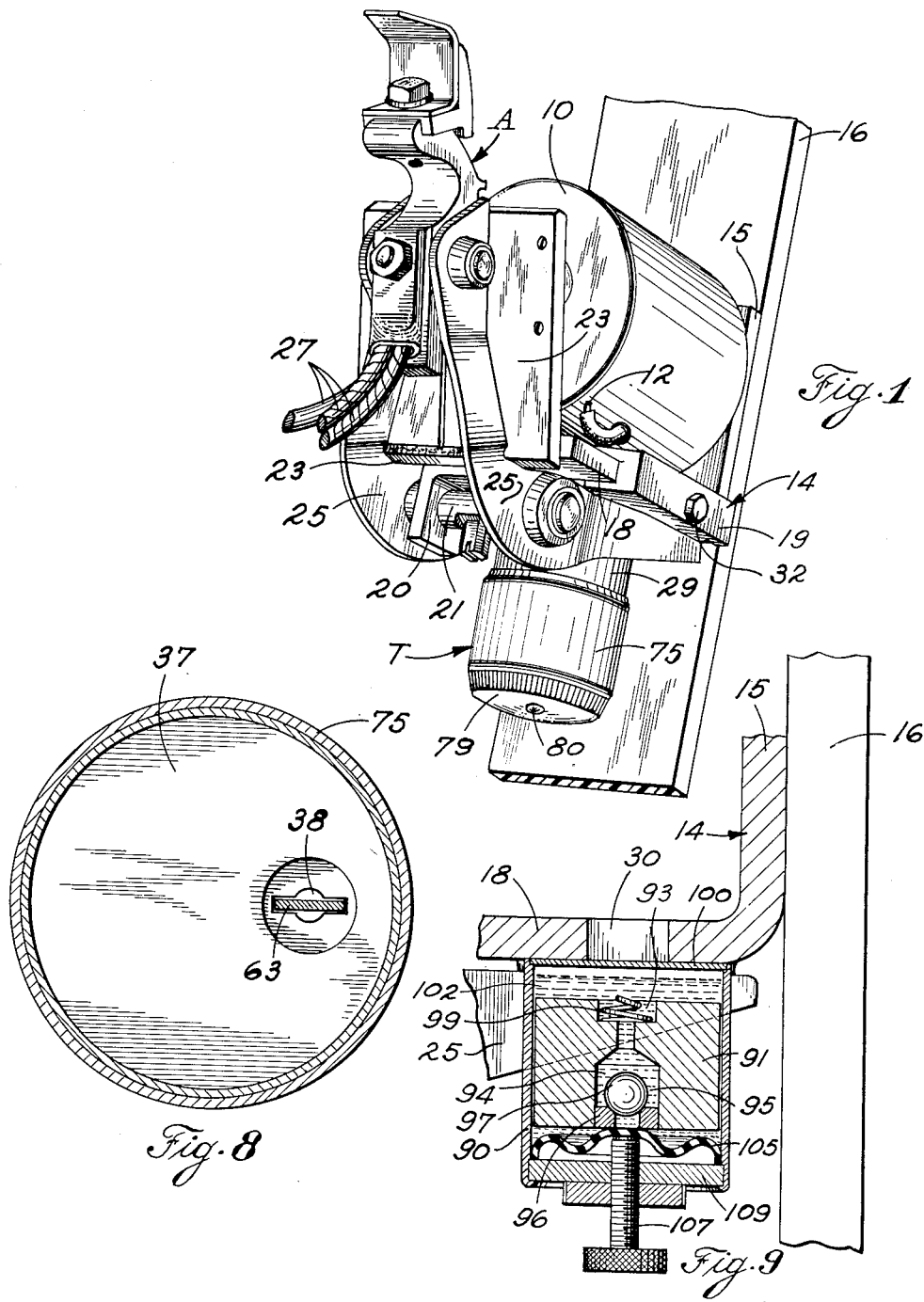
INVENTORS
MILTON WESLEY GRIFFES
& CHARLES WESLEY MERCHANT.
BY
RICHEY, WATTS, EDGERTON & McNENNY
B.D.Watts
ATTORNEYS

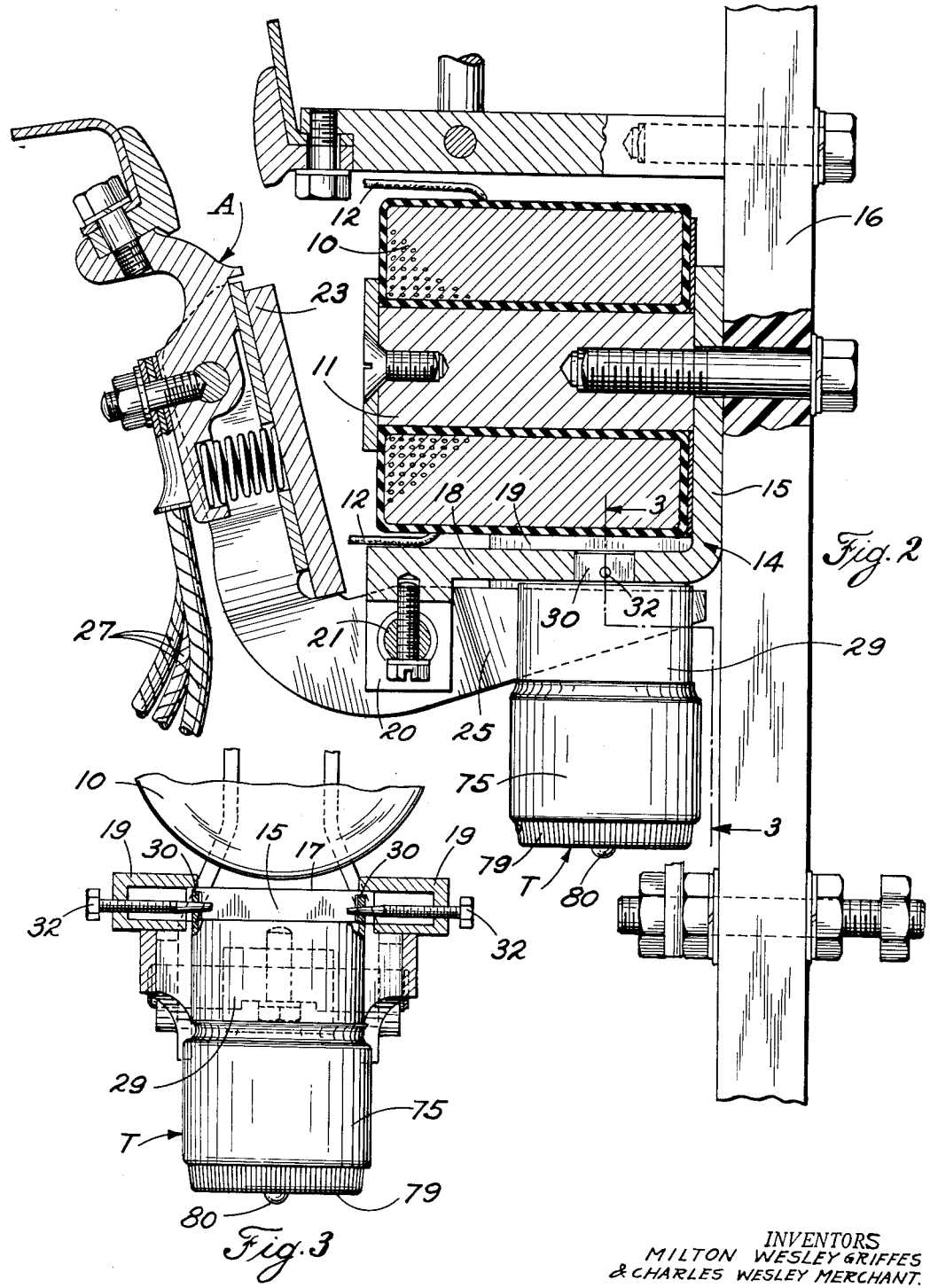

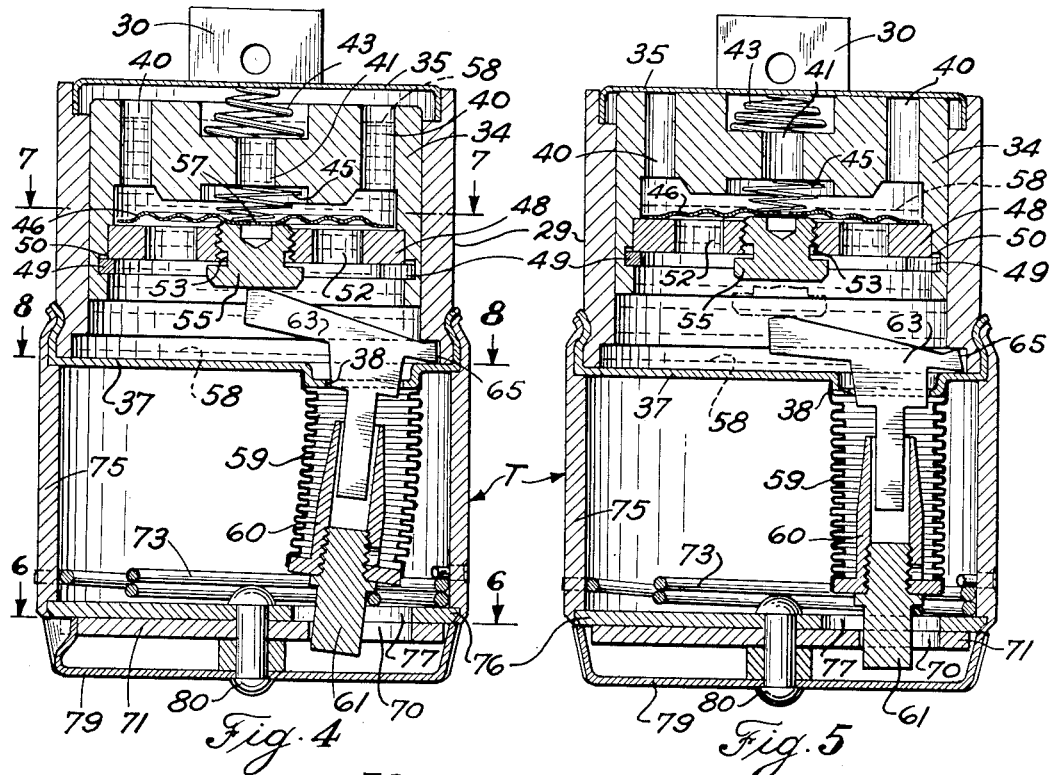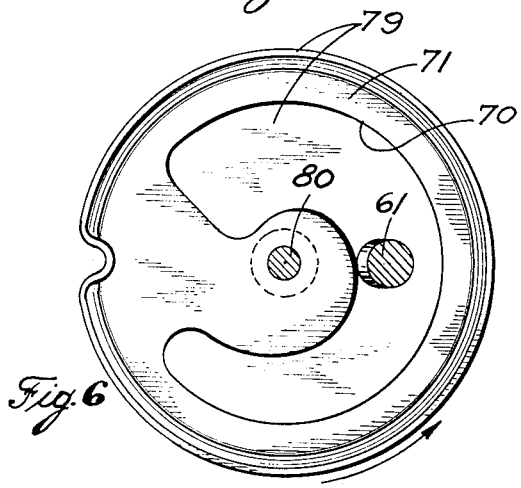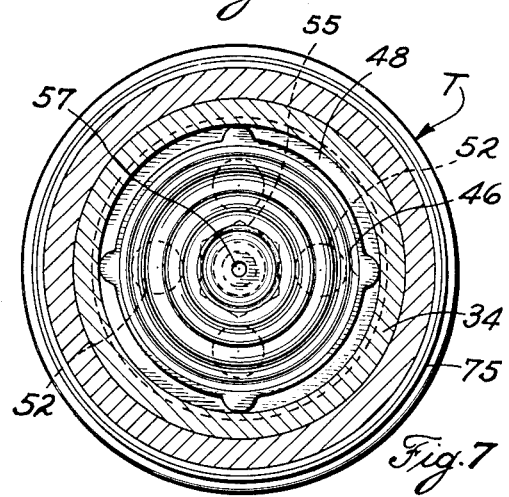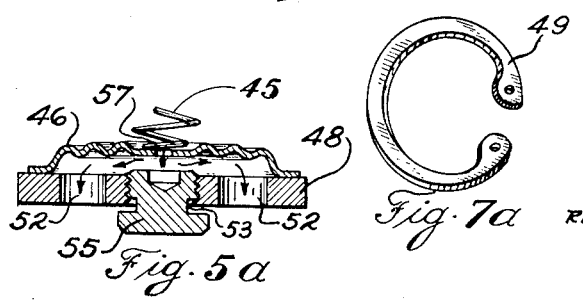
INVENTORS
MILTON WESLEY GRIFFES
& CHARLES WESLEY MERCHANT.
BY
RICHEY, WATTS, EDGERTON & McNENNY
ATTORNEYS

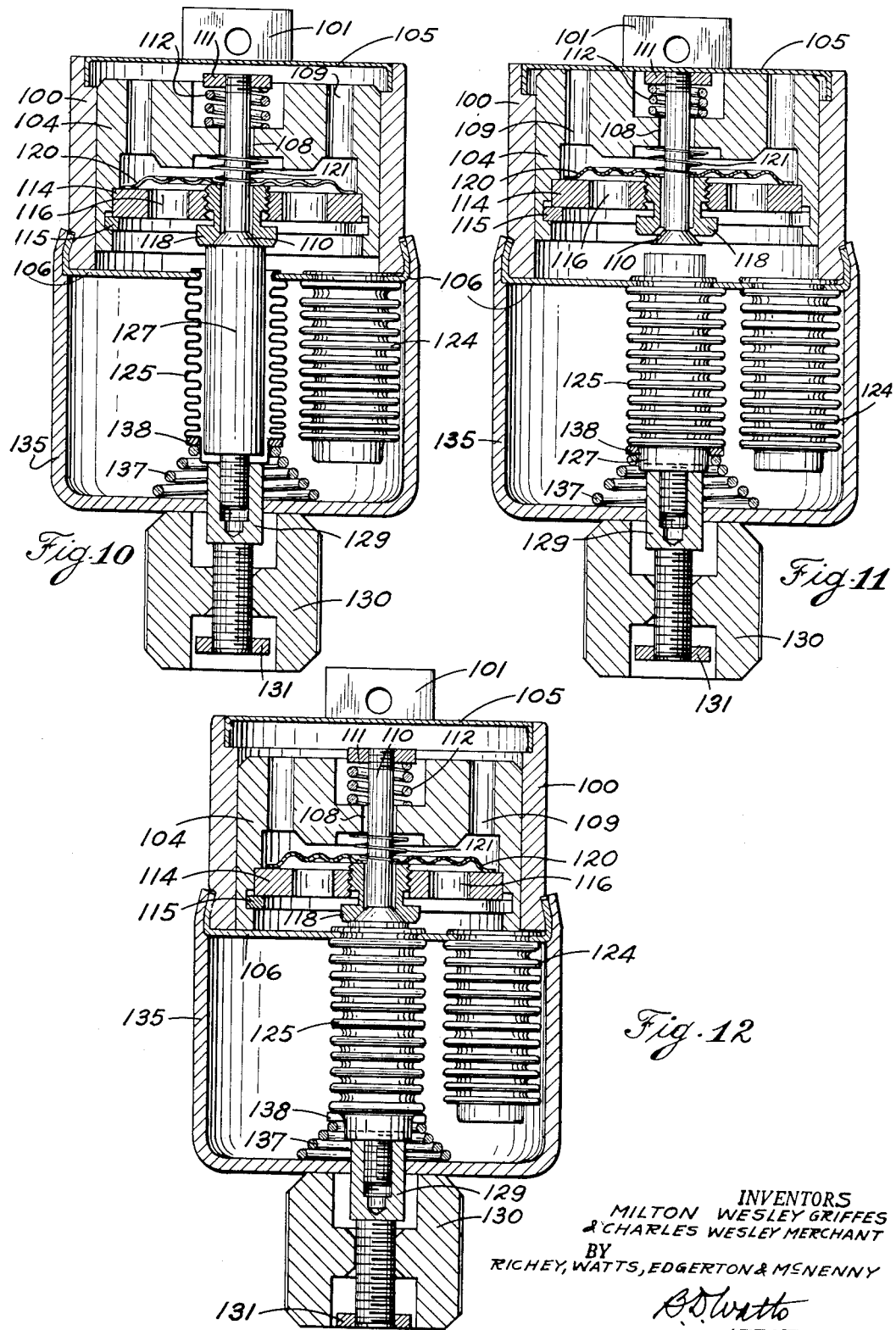

United States Patent Office 2,740,074
Patented Mar. 27, 1956

2,740,074

ELECTRIC CONTROL DEVICE

Milton W. Griffes and Charles W. Merchant, Lake County, Ohio, assignors to The Euclid Electric & Manufacturing Company, Madison, Ohio, a corporation of Ohio Application April 3, 1953, Serial No. 346,552

7 Claims. (Cl. 317—178)

The present invention relates generally to electric control devices and is more particularly concerned with a novel clapper-type contactor assembly and with a unique adjustable mechanism for timing the operation of said novel assembly.

In the operation of various types of electrical equipment, it is desirable or necessary that there be a time lag after the circuit is closed to start the equipment in operation and the time when the full electric power input is delivered to the equipment. Various means have been devised to meet this requirement and varying degrees of success have been obtained with them. Perhaps the most successful device is a direct current magnetic contactor of the clapper-type which was developed and placed on the market for the first time about twenty years ago. This device, despite certain important defects, has continued in general use to the present time. This prior art device employs a variable reluctance, hollow, cylindrical, contactor coil core. Through magnetic flux generated by the coil, the reluctance of the magnetic path is gradually changed by means of a steel piston moving slowly in the core, its motion being restrained by fluid in the core which is slowly by-passed around the piston. However, the operation of this contactor is sluggish because motion of the armature element is initiated by a force which is just sufficient to move it. Moreover, this device is not capable of producing decisive positive closure of the armature against the coil core such as is obtained with the clapper-type contactor where a timing device of this type is not employed. Still further, this device is defective from the standpoint of its limited range of adjustment and its failure to close firmly in certain adjustment positions.

By virtue of the present invention, these shortcomings and difficulties of the best prior art device of this type can readily be overcome and eliminated. In addition, this invention enables one to obtain advantages which cannot be realized in accordance with the prior art. For one thing, a range of time adjustment of running up to ten to one and higher ratios may be obtained. Also, this adjustment can be accomplished manually and quickly by operation of an element external to the timing device of this invention.

Additionally, unlike the contactor of the prior art described above, that of this assembly incorporates a novel lock-out feature which prevents the armature of the contactor from moving to close against the coil core until the timing cycle is complete and the full magnetic force is available to act on the contactor armature. As a result of this feature, the contactor cannot be prematurely closed due to rough service and vibration.

Additional advantages of this invention include easy removal and replacement of the timer mechanism if a different time-range unit is desired or if repair is necessary. Furthermore, in the preferred embodiment, the timing mechanism is contained in a hermetically sealed unit which assures exclusion of dirt and retention of fluid and long service life.

As still another important advantage, in a preferred embodiment this invention incorporates an automatic voltage compensation feature by means of which uniform timing action is obtainable over wide fluctuations of operating voltage.

Those skilled in the art will gain a further and better understanding of this invention upon consideration of the following detailed description, reference being had to the drawings accompanying and forming a part of the specification, in which:

Fig. 1 is a perspective view of a clapper-type contactor assembly embodying this invention in preferred form;

Fig. 2 is a side-elevational view, partly in section, of the assembly of Fig. 1;

Fig. 3 is a view partly in section taken on line 3—3 of Fig. 2;

Fig. 4 is a longitudinal sectional view of a timing mechanism embodying a preferred form of this invention;

Fig. 5 is a view like Fig. 4, but showing the adjusting means and piston element in alternative position;

Fig. 5a is a fragmentary sectional view of the said piston element, indicating the paths of liquid flow through the diaphragm and around the valve support member on the compression stroke;

Fig. 6 is a transverse sectional view taken on line 6—6 of Fig. 4;

Fig. 7 is a transverse sectional view taken on line 7—7 of Fig. 4;

Fig. 7a is a perspective view of the valve-supporting retaining ring of the Fig. 4 timing mechanism;

Fig. 8 is a transverse sectional view taken on line 8—8 of Fig. 4;

Fig. 9 is a longitudinal sectional view of another timing mechanism of this invention showing adjacent portions of a contact assembly stator and armature;

Fig. 10 is a longitudinal sectional view of another timing mechanism embodying a preferred form of this invention;

Fig. 11 is a view like Fig. 10 but shows the piston element in alternative position; and, Fig. 12 is a view like Fig. 10, but shows the piston element in retarded starting position.

In general, the electric control device of this invention, as shown in these drawings, comprises a coil having a core, an armature movable in response to magnetic impulses generated by the coil to engage the said core, a pair of permeable bodies adjacent to the coil and arranged with a non-magnetic gap between them, a permeable body bridging that gap and associated with the armature to hold the armature against closing against the core when the coil is energized, and means for releasing the armature and regulating movement of the armature toward engagement with the core. Said means includes a permeable member which is movable toward the coil when the coil is energized to substantially close the non-magnetic gap, thereby releasing the armature for motion to close against the coil core. In practice a stator is employed which includes said two spaced permeable portions and the armature is pivotally carried by the stator for motion in response to magnetic impulses generated by the coil. The armature in this type of arrangement has a head portion to contact the core and has a tail piece which is movable with the head portion and which extends from the stator armature pivot point so that it magnetically bridges the gap between the permeable portions of the stator. Also, the means for releasing the armature preferably includes an impermeable cylinder containing a permeable piston movable in the cylinder in the direction of the coil to substantially close the magnetic gap in the stator when the coil is energized. It also includes non-magnetic abutment means associated with the armature and the stator to engage the tail piece of the armature and thereby maintain a non-magnetic gap between that piece and the permeable portions of the stator, which is wider than the gap separating the piston in closed position from the said permeable portions of the stator. This latter means, those skilled in the art will understand, serves to enable the piston to shunt the armature tail piece, thus releasing the magnetic lock on the armature holding it in open position, whereupon the armature is caused to close rapidly and positively as stated above.

The adjustable timing mechanism controlling the operation of this electrical control device in general comprises a permeable piston reciprocable in the cylinder of non-permeable metal in response to magnetic forces applied by means of the coil of the assembly, and means in the cylinder and associated with the piston to limit piston travel in response to said forces to a predetermined maximum rate. Preferably in addition, this timing mechanism includes fluid in the cylinder and means associated with the piston and accessible exteriorly of the cylinder for positioning the piston in the cylinder to vary the length and period of the piston travel course. Also preferably, the permeable piston is provided with an aperture through which the fluid in the cylinder may flow as the piston is reciprocated.

More particularly and with reference to the drawings described above, an assembly embodying this invention comprises a coil 10 complete with a core 11 and with usual coil lead wires 12. Coil 10 is mounted on an L-shaped frame 14, the leg piece 15 of which underlies the coil and is secured to an insulating mounting base 16, as seen in Figs. 1 and 2. Piece 15 is permeable and has an edge portion opposed across an air gap 17 by another permeable plate 18 comprising a portion of the stator frame body. Plate 18 is supported in place by means of two brass columns 19 disposed on either side of the stator frame to preserve the non-magnetic gap between the said permeable elements. Also, plate 18 is provided with a yoke 20 extending downwardly from the under side of the stator frame to receive a bearing or shaft 21, the ends of which extend through either side of the yoke.

The assembly includes an armature element A which is made up of a head portion comprising a steel plate 23 engageable with the top of the coil core. The armature has a pair of spaced tail pieces 25 pivotally attached to the stator frame, apertures being provided in these members to receive the end portions of shaft 21. The end portions of the tail pieces are formed so that they may extend across the non-magnetic gap in the stator frame with the result that when the coil is energized with the armature in open position, the armature is magnetically held against closing by virtue of the bridging effect of the tail pieces across the said non-magnetic gap. It will be noted, however, that columns 19, rather than the steel components of the stator are engaged by tail pieces 25 so that a small non-magnetic space exists when the armature is in the open position. The relatively close engagement of steel armature tail pieces to the steel components of the stator produces a magnetic holding force considerably in excess of the magnetic attraction of the armature plate 23 to the coil core 11. The moving contact portion of the armature is provided with the usual flexible lead wires 27 which are clamped in any suitable manner in firm electrical contact with the armature head.

The timing mechanism T of the Fig. 1 assembly includes a cylinder 29 of non-permeable metal, suitably brass, one end of which is provided with a pair of diametrically opposed lugs 30 to extend into gap 17 and these lugs have transverse openings to receive the ends of opposed screws 32 extending through opposite sides of columns 19. In addition, a permeable piston 34 movable in the cylinder toward coil 10 when the coil is energized is provided to substantially close magnetic gap 17 in the stator frame. Piston 34 in its most advanced position engages the steel cap 35, providing a continuous permeable flux path across gap 17 between separated stator elements 15 and 18. The effect of this construction is to shunt the armature tail pieces when piston 34 is moved to its most advanced position. This results in the armature being released to close quickly and positively under forces applied by the magnetic flux of the coil to the head portion of the armature.

Cylinder 29 is sealed by means of a cap 37 at its other (lower) end, the cylinder being mounted with its long axis extending substantially vertically and the coil being disposed above the cylinder so that gravity as well as magnetic flux forces tend to hold the armature in open position, as indicated in Fig. 1. Cap 37 is of non-permeable metal, while cap 35 is of permeable metal and both are hermetically sealed to the cylinder, but bottom cap 37 has a transverse opening 38 adjacent to an edge portion for a purpose to be described.

Piston 34 has a plurality of axially extending apertures 40 adjacent to its outer edge and has a central axis aperture 41. A cylinder spring 43 is provided to resiliently oppose piston engagement with cap 35, being fastened to the piston and partly contained in the enlarged upper end of axial aperture 41 and having a free portion extending upwardly from the piston for engagement with cap 35, as shown in Figs. 4 and 5. Another purpose of cylinder spring 43 is to provide, after coil deenergization, a downward force in addition to gravity to quickly overcome the restraining suction seal force due to a very thin layer of fluid between the flat surfaces of the piston top and the cap 35. A somewhat lighter coil spring 45 is also secured to the piston and carried thereby, being fitted in an enlarged diameter portion of the lower end of aperture 41 and having a free end portion extending downwardly for engagement with a valve diaphragm 46. The spring 45 serves to maintain slight downward pressure to assist the force of gravity in restoring or keeping the valve diaphragm outer edge in engagement with valve support member 48.

Piston 34 is controlled in its travel under magnetic flux forces in the direction of the coil by means of a diaphragm valve carried by the piston and disposed within it. This valve comprises a valve support member 48 in the form of a disc held in place within the piston by means of split retaining ring 49 anchored in an annular slot 50 in the inner wall of the piston. The valve support member, like the piston, has a plurality of apertures 52 extending axially of the piston and has a threaded central or axial aperture 53 in which a screw valve seat member 55 is disposed. Thin, corrugated metal, valve diaphragm 46 is supported by member 48 disposed for liquid-tight engagement with the upper, outer exposed edge portion of said support member to stop fluid flow through the piston. The diaphragm 46, however, is provided with a small central opening 57 through which fluid may pass.

Fluid 58 is liquid-tightly sealed in cylinder 29 despite opening 38 in bottom cap 37. A metal bellows 59 is employed for this sealing purpose being connected to the said bottom cap and to an adjustment sleeve member 60 which in turn is liquid-tightly closed by a plug 61 screwed into member 60 and extending generally lengthwise of the cylinder and constituting a part of means for positioning the piston.

The said positioning mechanism also includes an adjustment lever 63 of generally T-shape in side elevation, the leg of which extends downwardly in bellows 59 and is received in the upper end of adjustment sleeve 60. One end of the top member 63 bears against the under side of valve seat plug 55, while the other end is received in a recess 65 defined by the lower side wall portion of the cylinder and bottom cap 37 so that lever 63 may be rocked about this latter end as a pivot to move the piston upwardly, downward motion of the piston being accomplished by gravity when the support of lever 63 is withdrawn. The adjustment sleeve plug extends through a cam slot 70 in a cam plate 71, the plug being held firmly against the inner face of the cam surface by means of an adjustment spring 73 seen in Figs. 4 and 5. The shape of the cam surface is best shown in Fig. 6.

Spring 73, the bellows adjustment sleeve and the upper end of the adjustment sleeve plug are housed in an adjustment cylinder 75 secured to the lower end of cylinder 29 and closed at its lower end by means of a cylinder plate 76 having a slot 77 to receive the lower end of plug 61. An adjustment cap 79 is provided at the bottom of the adjustment cylinder and is held in place by means of an axial rivet 80 so that as the cap is turned relative to the adjustment cylinder, the cam plate is turned with it to rock lever 63 and elevate piston 34. In this particular embodiment, the adjustment cap is capable of movement through about 270°, giving an unusually wide range of time selection.

In the operation of the device of this preferred embodiment of this invention with piston 34 at rest position, coil 10 is energized, as described above, establishing the aforesaid magnetic flux path and causing the piston to begin travel upwardly toward its closed position. The fluid in cylinder 29 is thereby caused to apply a force against valve diaphragm 46, deflecting the central portions only of said diaphragm, the peripheral portions being held tightly against diaphragm support member 48 by the fluid pressure. The diaphragm valve is thereby sealed except for small central opening 57 in diaphragm 46, which allows relatively slow by-pass of liquid through the valve. There is normally a small initial gap provided between the diaphragm 46, and the valve seat 55, obtained by adjustment of the threaded portion of the valve seat. This gap as initially adjusted permits a certain desired amount of displaced liquid to flow from the top chamber of the cylinder and into the lower part thereof below piston 34. Thus, liquid flows between the top surface of the valve seat member 55 and through the four holes 52 in valve support disc 48. It follows that as the pressure on the liquid and on the diaphragm is increased due to an increase in voltage applied to coil 10, the force causing the piston to move upwardly will increase and the clearance between the diaphragm and the valve seat be correspondingly reduced. It also follows that the rate of liquid flow through diaphragm opening 57 is governed by the amount of space existing between the valve seat and valve seat-engaging portion of the diaphragm. Consequently, the amount of liquid by-passing through the diaphragm valve is approximately inversely proportional to the magnetic pull or force applied to the piston so that the diaphragm valve in this arrangement automatically compensates for variations in this upwardly drawing force applied to the piston and assures a substantially constant rate of travel of the piston regardless of fluctuations in coil potential.

Diaphragm 46 will lift readily from valve seat member 55 upon the application of pressure delivered upwardly by liquid lying beneath the diaphargm. Therefore, the piston will rapidly return under force of gravity to its starting or rest position the liquid being displaced quickly and flowing upwardly through the four holes in the diaphragm support, around the edge of the diaphragm and through holes 40 and 41 in the piston. Thus, the diaphragm serves in the dual capacity as a check valve and as a metering valve for automatic voltage compensation.

The timing mechanism illustrated in Fig. 9 comprises a cylinder 90 of non-permeable metal and a steel piston 91 disposed in the cylinder having an axial aperture 93 with an enlarged diameter portion 94 in which is housed a ball check valve. Valve 95 is made up of a valve seat ring 96 suitably welded in place in the lower end of piston 91 within aperture 93 and a metal ball 97 floating in the said enlarged portion for sealing engagement with seat 96 when the piston is moved toward coil 10. The piston also has at its upper end a spring 99 secured suitably within aperture 93, the outer free end of this spring being disposed to engage upper end wall or top cap 100 of the cylinder to resiliently oppose seating of the piston against said cap 100 and to break fluid seal. The cylinder has sealed within it a light viscous liquid 102 which is stable and which has substantially constant temperature characteristics. This fluid is retained in the cylinder by means of cap 100 and rubber diaphragm 105 bonded around its periphery liquid-tightly to the walls of the cylinder near its lower end.

Adjustment of the lower or rest position of the piston is obtained by means of adjustment screw 107, which extends through the lower end wall 109 of the piston and has an inner or upper end to bear against diaphragm 105, whereby the piston may readily be moved upwardly by turning screw 107 in one direction, or may be lowered by means of gravity by turning this adjustment screw in the other direction and allowing the piston to follow it down to a lower level.

In the operation of the assembly with this Fig. 9 timing mechanism incorporated therein, a coil is energized by closing the circuit (not shown) and thereby delivering electricity to the coil in the usual way. The immediate result is establishment of a magnetic field which extends longitudinally of the coil running through the upper steel stator element 18, through the gap-straddling tail pieces 25 of the armature, through piston 91 in its lower-most or rest position, and thence into and through the lower steel stator element 15 and back to coil core 10, as generally outlined in Fig. 2. The armature, as stated above, is locked in the open position by the combination of the force of the flux travelling through the bridging tail members and by virtue of gravitational force opposing forces tending to draw the armature head toward the end of the coil core. Almost immediately the piston begins to travel toward the core, forcing the liquid in the cylinder through aperture 94 and against ball 97 and causing the ball to seat tightly against the seating ring 96. The motion of the piston toward the coil thus is restrained to a certain extent, depending upon how tightly the ball check valve is closed and depending upon how tightly the piston is fitted in the cylinder. In the preferred embodiment of this invention the restraint of fluid flow through and around the piston, and consequently the restraint on piston travel toward the core, is such that several seconds are required for the piston to complete its travel upwardly to a point where nearly all the magnetic flux traverses gap 30 by way of the piston rather than by way of the armature tail pieces. In the illustrated construction of this form of the invention there is insufficient flux to close the armature, and there is sufficient flux to efficiently lock out the armature by means of the gap bridging tail pieces, to prevent the contactor from closing until the piston is seated firmly against top cap 100. No contactor action takes place, therefore, until the piston has completed its full travel and the allotted time between energizing of the coil and closing of the armature has elapsed.

Variation in this allotted time is obtained as suggested above by turning adjustment screw 107 one way or the other to raise or lower the piston, thereby increasing or decreasing the length of its travel course from the rest position to the closed position.

This type of timing mechanism is especially suitable where a substantially constant potential is maintained on the contactor coil and accordingly a force increasing intensity is applied to the piston to cause the piston to close, this force varying in accordance with the law of the inverse square of the distance, as those skilled in the art will understand. It will also be understood, however, that it is possible through the use of this assembly and this particular timing control mechanism to obtain a variation in time adjustment independently of the manipulation of the adjustment screw. This is accomplished by varying the intensity of the magnetic flux and this principle has special application in connection with the operation of certain types of electrical devices as those skilled in the art will understand.

Where the potential of the contactor coil varies through variations in line voltage, for instance, and it is necessary that piston travel be at a substantially constant rate, the preferred embodiment of the timing control mechanism of this invention is used in the assembly of this invention.

The preferred embodiment of this invention illustrated in Figs. 10, 11 and 12 bears a general resemblance in structure, mode of operation and results to the other embodiments of this invention described in detail above. The timing mechanism in this instance comprises a cylinder 100 of non-permeable metal such as brass, one end of which is provided with diametrically opposed lugs 101 to extend into magnetic gap 17 in the stator frame, these lugs having transverse openings to receive the ends of screws 32 extending through opposite sides of columns 19 of said frame. In addition, a permeable piston 104 movable in the cylinder toward coil 10 when that coil is energized is provided substantially to close gap 17 in the stator frame. Piston 104 in its most advanced position, as indicated in Fig. 11, bears against steel cap 105, providing a continuous permeable flux path across gap 17 between separated stator elements 15 and 18 as described above in reference to the other preferred embodiments of the timing mechanism of this invention. The effect of this construction is to magnetically shunt the armature tail pieces when piston 104 is moved to its most advanced position. This results in the armature being released so that it closes quickly and positively under forces applied by the magnetic flux of the coil to the head portion of the armature.

Cylinder 100 is closed at its other (normally lower) end by means of a cap 106, the cylinder being mounted so that its longitudinal axis extends substantially vertically with the coil of the assembly being disposed above the cylinder in order that gravity as well as magnetic flux forces tend to hold the armature in its open position, as indicated in Fig. 1. Cap 106, like the cylinder, is of non-permeable metal, while cap 105 is permeable. Both these caps are hermetically sealed to the cylinder, but while cap 105 is imperforate, cap 106 has a transverse opening in the central portion and a second opening adjacent to an edge portion of the lower end of the cylinder.

Piston 104 has an axial aperture 108 and a plurality of apertures 109 in its outer edge portion disposed substantially parallel to the piston axis. Valve stem 110 extends longitudinally through aperture 108. A nut 111 is screwed onto the upper end of the valve stem and serves to retain in place a cylinder spring 112 which, due to its compression between nut 111 and an opposed inner abutment portion of the piston, tends resiliently to move the valve stem into closed position and to hold it there against a valve seating element to be described. Spring 112 serves the further purpose of providing a break-away force to overcome the seal suction at the end of the upward piston travel after magnetic forces have been removed.

Piston 104 is controlled in its travel under magnetic flux forces in the direction of the coil (upwardly) by means of a diaphragm valve carried by the piston and disposed within it. The diaphragm valve comprises a valve support member 114 in the form of a disc secured in place within the piston by means of a split retaining ring 115 which is anchored in an annular slot in the inner wall of the lower end of piston 104. Valve support member 114, like piston 104, has a plurality of apertures 116, one of which is an axial one and the others of which are spaced therearound with axes paralleling that of the piston, and has a threaded central or axial aperture on which a screw seat valve member 118 is disposed. The valve diaphragm 120 is of thin metal construction and has a plurality of annular corrugations centered around an axial opening through the diaphragm. Diaphragm 120 is supported by valve support member 114 for liquid-tight engagement with the upper outer edge portion of said support member to stop fluid flow through the piston. Fluid is, however, permitted to pass through the axial or central opening in the diaphragm and around valve stem 110 underneath valve diaphragm across the top surface of valve seat 118 and down through apertures 116 into space below the piston. The amount of fluid passing through the relatively large central diaphragm hole around valve stem 100 is controlled by the spacing between the diaphragm and the upper horizontal surface of valve seat 118. The flow of fluid is therefore a function of the upward magnetic attraction force exerted on the piston and resultant deflection of the diaphragm to modulate this spacing or opening. Uniform speed of piston travel is accomplished by controlling this fluid flow inversely proportional to the magnetic attraction. This method of compensating for voltage fluctuations is described in detail in other embodiments of this invention. A relatively light coil spring 121 is disposed around valve stem 110 and between an inner abutment of aperture 108 of the piston and the upper surface of the valve diaphragm. Spring 121 serves to maintain slight downward pressure on the diaphragm to assist gravity in restoring or keeping the diaphragm in engagement with valve support member 114.

Valve seat member 118 has two different valve seating portions, the upper one of which is disposed for functions just described to provide compensation for voltage fluctuations. The lower sealing portion is defined in the flared lower end of the axial aperture through the said member 118. The lower end of the valve stem is shaped to mate with this latter sealing surface portion to control rapid fluid by-pass through the piston at the end of the piston upward travel, as illustrated in Fig. 11. Rapid traverse by the piston for the last approximately one thirty-second of an inch in its upward travel is desirable where greater accuracy of timing is desired under conditions of extreme voltage fluctuations. As the upper portion of valve stem 110 engages the steel cap 105, continued piston movement opens the lower valve to permit rapid release of remaining entrapped fluid above the piston. Under high voltage conditions sufficient magnetic flux is sometimes produced to cause premature armature movement before the piston is finally sealed at the top. Hastening the piston movement near this final position eliminates small timing errors due to premature action of armature closing before the piston has reached final sealing position.

As in the Fig. 4 form of this invention, a metal bellows 124 is provided as reservoir means and expansion chamber for fluid to be used in the operation of this timing mechanism. Bellows 124 is fluid-tightly connected to lower cap piece 106 and communicates with the piston chamber. A second bellows 125 is similarly fluid-tightly connected to cap 106 and communicates with the piston chamber through the central opening in said cap 106. Bellows 125 houses a positioning mechanism element in the form of an elongated cylindrical body 127 having an upper end portion projecting into the position chamber for engagement with valve stem 110, these two parts being substantially co-axial. Body 127 has a lower threaded end portion of reduced diameter onto which an adjustment shaft 129 is screwed. This threaded end portion of body 127 extends through an axial opening in the lower end of bellows 125 to which it is sealingly connected against the escape of fluid from within the bellows. The lower end of shaft 129 is likewise of reduced diameter and threaded and an adjustment nut 130 is screwed thereon. A retaining washer 131 is screwed on the lower extremity of shaft 129 and disposed in a recess in the lower end of nut 130 for engagement with an inner abutment in nut 130.

Bellows 124 and 125, together with the adjustment element 127 and the upper end portion of adjustment shaft 129, are housed in adjustment housing 135 which is generally cup-shaped and is sealed to the lower end of the cylinder cap 106 and is provided with an axial aperture through which adjustment shaft 127 extends for engagement with nut 130. A coil spring 137 is disposed within housing 135 and bears upon the inner side of the housing around said axial aperture therein and upon a washer 138 disposed around the lower end of the bellows 125. This spring bears upon washer 138, thus maintaining engagement of adjustment nut 130 with the outer side of housing 135. This spring also serves to prevent excessive pressure from developing on the diaphragm as a result of turning nut 130 too rapidly to adjust upwardly the starting position of the piston.

The operation of the device of Figs. 10, 11 and 12 is generally similar to that of those embodiments of the invention described above and particularly that illustrated in Fig. 4. The adjustment of the starting position of the piston is accomplished in essentially the same manner as in the case of the Fig. 4 device with the adjustments being made by turning the nut 130 clock-wise or counter clock-wise, depending upon whether the movement of the piston should be upward under the urging of the adjustment element 127 or downward under the effects of gravity when the support of element 127 is removed.

Having thus described the present invention so that those skilled in the art may be able to gain a better understanding and practice the same, we state that what we desire to secure by Letters Patent is defined in what is claimed.

What is claimed is:

1. An electric control device comprising a coil having a core, a stator adjacent to the coil having two permeable portions and a non-magnetic portion disposed therebetween, an armature pivotally carried by the stator for motion in response to magnetic impulses generated by the said coil, said armature having a head portion to contact the said core and having a pair of spaced tail pieces extending from the stator-armature pivot to bridge magnetically the gap between said permeable portions formed by said non-magnetic portion of the stator, and means for regulating movement of the armature in response to forces exerted on said armature by magnetic flux, said means including a cylinder and a piston of permeable metal moveable in the cylinder toward the coil when the coil is energized to substantially close the magnetic gap in the stator.

2. An electric control device comprising a coil having a core, a stator adjacent to the coil having two permeable portions and a non-magnetic portion disposed therebe tween, an armature pivotally carried by the stator for motion in response to magnetic impulses generated by the said coil, said armature having a head portion to contact the said core and having a tail piece rigidly connected to said head portion for motion therewith and extending from the stator-armature pivot to bridge magnetically the gap between said permeable portions formed by said non-magnetic portion of the stator, and means for regulating movement of the armature in response to forces exerted on said armature by magnetic flux, said means including a cylinder and a permeable piston bridging magnetically said gap and moveable in the cylinder toward the coil when the coil is energized to substantially close the magnetic gap in the stator.

3. An electric control device comprising a coil having a core, a stator adjacent to the coil having two permeable portions and a non-magnetic portion disposed therebetween, an armature pivotally carried by the stator for motion in response to magnetic impulses generated by the said coil, said armature having a head portion to contact the said core and having a tail piece rigidly connected to said head portion for motion therewith and extending from the stator-armature pivot to bridge magnetically the gap between said permeable portions formed by said non-magnetic portion of the stator, means for regulating movement of the armature in response to forces exerted on said armature by magnetic flux, said means including a cylinder and a permeable piston magnetically bridging said gap and movable in the cylinder toward the coil when the coil is energized to substantially close the magnetic gap in the stator, and non-magnetic abutment means associated with the armature and stator to engage the said tail piece and maintain a non-magnetic gap between said piece and the permeable portions of the stator substantially wider than the gap separating the said piston in closed position from said permeable portions.

4. An electric control device comprising a coil having a core, an armature moveable in response to magnetic impulses generated by the said coil to engage said core, a pair of permeable bodies adjacent to the coil arranged with a non-magnetic gap between them, a permeable body bridging said gap and associated with the armature to hold the armature against closing in contact with the said core when the coil is energized, and means for releasing the armature and regulating movement of said armature toward engagement with the said core, said means including a permeable member movable toward the coil when the coil is energized to substantially close said non-magnetic gap and thereby release said armature for motion to close against the coil core.

5. An electric control device comprising a coil having a core, a stator adjacent to the coil having two spaced permeable portions, an armature pivotally carried by the stator for motion in response to magnetic impulses generated by the said coil, said armature having a head portion to contact the said core and having a tail piece movable with the said head portion and extending from the stator-armature pivot to bridge magnetically the gap between said permeable portions, and adjustable means for regulating movement of the armature in response to forces exerted on said armature by magnetic flux, said means including a non-permeable cylinder, a permeable piston moveable in the cylinder toward the coil when the coil is energized to substantially close the magnetic gap in the stator, means associated with the piston and accessible exteriorly of the cylinder for positioning the piston in the cylinder to vary the length and period of the piston travel course, and means in the cylinder and associated with the piston to limit piston travel toward the coil to a predetermined maximum rate.

6. An electric control device comprising a coil having a core, an armature movable in response to magnetic impulses generated by the said coil to engage said core, said armature and coil defining a first non-magnetic gap prior to energization of the coil, a pair of permeable bodies adjacent to the coil arranged to provide a second non-magnetic gap of substantially smaller span than the first non-magnetic gap, a permeable body bridging said second gap and connected to the armature to hold the armature against closing in contact with the said core when the coil is energized, and means for releasing the armature and regulating movement of said armature toward engagement with the said core, said means including a permeable member movable toward the coil when the coil is energized to substantially close said second non-magnetic gap and thereby release said armature for motion to close against the coil core.

7. An electric control device comprising a coil having a core, a stator adjacent to the coil, an armature pivotally mounted on the stator and movable in response to magnetic impulses generated by the said coil to engage said core and having spaced tail pieces, said armature and coil defining a first non-magnetic gap prior to energization of the coil, a pair of permeable bodies adjacent to the coil arranged to provide a second non-magnetic gap of substantially smaller span than the first said gap, said tail pieces bridging the second gap to hold the armature against closing in contact with the said core when the coil is energized, and means for releasing the armature and regulating movement of said armature toward engagement with the said core, said means including a permeable member movable toward the coil when the coil is energized to substantially close said second non-magnetic gap and thereby release said armature tail pieces for motion of the armature around its pivot.

References Cited in the file of this patent

UNITED STATES PATENTS

| | | |
|---|---|---|
| 1,301,991 | Aichele | Apr. 29, 1919 |
| 1,903,738 | Munson | Apr. 11, 1933 |
| 2,029,136 | Stevens | Jan. 28, 1936 |
| 2,373,998 | Burgwin | Apr. 17, 1945 |
| 2,397,181 | Immel | Mar. 16, 1946 |

FOREIGN PATENTS

| | | |
|---|---|---|
| 595,731 | France | Oct. 8, 1925 |
| 499,577 | Germany | June 14, 1930 |